US011977706B2

(12) United States Patent
Terada (10) Patent No.: US 11,977,706 B2
(45) Date of Patent: May 7, 2024

(54) TOUCH PANEL DEVICE

(71) Applicant: ALPS ALPINE CO., LTD., Tokyo (JP)

(72) Inventor: Masanori Terada, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/199,537

(22) Filed: May 19, 2023

(65) Prior Publication Data

US 2023/0418423 A1 Dec. 28, 2023

(30) Foreign Application Priority Data

Jun. 27, 2022 (JP) .................... 2022-102303

(51) Int. Cl.
*G06F 3/044* (2006.01)

(52) U.S. Cl.
CPC .. *G06F 3/0446* (2019.05); *G06F 2203/04111* (2013.01)

(58) Field of Classification Search
CPC .. G06F 3/04166; G06F 3/04168; G06F 3/044; G06F 3/0446; G06F 2203/04101; G06F 2203/04108; G06F 2203/04111
See application file for complete search history.

(56) References Cited

U.S. PATENT DOCUMENTS

| 10,866,677 B2 | 12/2020 | Haraikawa | |
| 2011/0267309 A1* | 11/2011 | Hanauer | G06F 3/0446 345/174 |
| 2012/0050180 A1* | 3/2012 | King | G06F 3/041662 345/173 |
| 2014/0071085 A1* | 3/2014 | Kasamatsu | G06F 3/041 345/174 |

(Continued)

FOREIGN PATENT DOCUMENTS

| JP | 2011-210038 A | 10/2011 |
| JP | 2012103995 A * | 5/2012 |

(Continued)

OTHER PUBLICATIONS

Extended European Search Report for European Patent Application No. 23179951.1 dated Nov. 6, 2023, 10 pages.

*Primary Examiner* — Joe H Cheng
(74) *Attorney, Agent, or Firm* — Crowell & Moring LLP (57) ABSTRACT

A touch panel device includes a capacitance type touch panel having a plurality of electrodes arranged in directions intersecting each other, a capacitance measurement unit that measures capacitance of each electrode pair, a baseline value setting unit that sets the capacitance of each electrode pair in a state where an indicator is not in contact as a baseline value, a position detection unit that detects a contact position of the indicator by comparing the capacitance of each electrode pair measured by the capacitance measurement unit with the baseline value, and a baseline value correction unit that varies the baseline value in accordance with the variation when the capacitance of each electrode pair varies with the lapse of time. The baseline value correction unit sets the time X for varying the baseline value and/or the upper limit value Y thereof for each electrode pair according to the capacitance of each electrode pair.

16 Claims, 6 Drawing Sheets

(56) References Cited

U.S. PATENT DOCUMENTS

| | | | |
|---|---|---|---|
| 2015/0002459 A1* | 1/2015 | Watanabe | G06F 3/04186 |
| | | | 345/174 |
| 2015/0379914 A1 | 12/2015 | Imai et al. | |
| 2016/0231860 A1* | 8/2016 | Elia | G06F 3/0418 |
| 2018/0173366 A1* | 6/2018 | Zhang | G06F 3/0446 |
| 2020/0050341 A1* | 2/2020 | Tabata | G06F 3/04166 |
| 2020/0142533 A1 | 5/2020 | Seo et al. | |

FOREIGN PATENT DOCUMENTS

| | | | |
|---|---|---|---|
| JP | 2013-114326 A | | 6/2013 |
| JP | 2013190850 A | * | 9/2013 |
| JP | 2020080076 | | 5/2020 |
| KR | 20140094165 A | * | 7/2014 |
| WO | WO 2021/149171 A1 | | 7/2021 |

* cited by examiner

TOUCH PANEL DEVICE

RELATED APPLICATION

The present application claims priority to Japanese Patent Application Number 2022-102303, filed Jun. 27, 2022, the entirety of which is hereby incorporated by reference.

BACKGROUND

1. Field of the Invention

The present invention relates to a touch panel device that detects a contact position of an indicator.

2. Description of the Related Art

Conventionally, a touch panel that detects whether an object such as a finger is touching based on whether a difference between a Raw value, which is a measurement value of a capacitance sensor, and a baseline value is equal to or greater than a threshold value is known (e.g., refer to JP 2020-80076 A). The touch panel is provided with a baseline value update unit that updates the baseline value to follow the Raw value of capacitance in order to correct variations of the capacitance of the capacitance sensor due to temperature changes. Even if the capacitance of the capacitance sensor changes with a change in temperature, the baseline value is changed to follow the change, thereby preventing erroneous detection in a state where no object is touching.

Even in a case where the baseline value is updated to follow change a in capacitance due to a temperature change as in the touch panel disclosed in JP 2020-80076 A described above, it is necessary to detect that the capacitance has changed with the approach of the object. That is, the baseline value needs to change slowly with respect to the approach of an object and change quickly with respect to temperature change, and in the touch panel of JP 2020-80076 A described above, the manner of changing the baseline value is changed by detecting the presence or absence of the approach of an object using the proximity detection unit. However, in this method, there is a problem that an additional proximity detection unit is required, which complicates the configuration.

In general, in a capacitive sensor, a sensor conductor and a ground layer overlap, an optical clear adhesive (OCA), a polarizing layer, or the like is disposed between the sensor conductor and the ground layer, and a wiring is further drawn out to be adjacent to the sensor conductor and the ground layer. Therefore, even when an object is not close to the sensor, the capacitance of the capacitive sensor is not the same at each location. For this reason, calibration is performed, and the baseline value is set in accordance with the non-uniform capacitance.

However, in a case where the capacitance sensor has different capacitance in different places as described above, the degree of capacitance that changes with temperature changes varies. Specifically, the larger the capacitance of the capacitance sensor, the larger the amount of change in capacitance with a temperature change. For this reason, in a place where the capacitance of the capacitance sensor is partially large, when the ambient temperature rapidly changes, the Raw value becomes large and exceeds the baseline value even though no object is actually approaching, and there is a problem that erroneous detection occurs.

SUMMARY

The present disclosure has been made in view of this, and an object of the present disclosure is to provide a touch panel device capable of preventing erroneous detection at the time of a rapid temperature change due to variation in capacitance without complicating a configuration.

In order to solve the above-described problems, a touch panel device of the present disclosure includes a capacitance type touch panel having a plurality of electrodes arranged in directions intersecting each other, a capacitance measurement unit that measures a capacitance between each pair of the electrodes intersecting each other, a baseline value setting unit that sets the capacitance for each electrode pair measured by the capacitance measurement unit as a reference capacitance in a state where an indicator is not in contact, and sets the baseline value as a baseline value to be used for comparison of capacitance for detecting presence or absence of contact of the indicator, prior to detection of a contact position of the indicator, a position detection unit that detects a contact position of the indicator by comparing the capacitance of each electrode pair measured by the capacitance measurement unit with the corresponding baseline value, and a baseline value correction unit that varies the baseline value in accordance with a variation in the capacitance of each electrode pair measured by the capacitance measurement unit over time when a contact position of the indicator is detected, in which the baseline value correction unit sets a time X for varying the baseline value and/or an upper limit value Y thereof for each electrode pair according to the reference electrostatic capacitance of each electrode pair.

In a case where there is a variation in the capacitance of each electrode pair in the touch panel, the baseline value can be changed for each capacitance, so that it is possible to prevent erroneous detection at the time of a rapid temperature change due to this variation. In addition, since it is not necessary to determine the presence or absence of an indicator (object of position detection) when changing the baseline value, a configuration for performing this determination is unnecessary, and the configuration can be simplified.

In addition, it is preferable that the above-described baseline value correction unit set the time X to a small value and/or the upper limit value Y to a large value when the reference capacitance of each electrode pair is large, and set the time X to a large value and/or the upper limit value Y to a small value when the reference capacitance of each electrode pair is small. As a result, it is possible to individually set the time X and the upper limit value Y in accordance with the capacitance of each electrode pair to set the baseline value suitable for preventing erroneous detection.

In addition, it is preferable that the above-described baseline value correction unit set the time X and the upper limit value Y so that an increase in the baseline value corresponding to each of the electrode pairs does not catch up with an increase in the capacitance when the capacitance of each of the electrode pairs increases in response to an approach of the indicator to the touch panel. As a result, it is possible to set a baseline value suitable for preventing erroneous detection for each electrode pair having variation in capacitance, and to improve the position detection accuracy when the indicator approaches.

In addition, it is preferable that a temperature detection unit that detects an ambient temperature of the above-described touch panel be further provided, and that the baseline value correction unit change the time X and/or the upper limit value Y when a change amount of the temperature detected by the temperature detection unit in a fixed time exceeds a predetermined value. As a result, it is possible to reliably prevent erroneous detection in an environment where a temperature change is severe.

In addition, it is preferable that the above-described baseline value correction unit change the time X for each of the electrode pairs as a cycle of varying the baseline value to (A/a)·X, where A is an average value of the capacitances of the electrode pairs, and a is an individual capacitance of the electrode pairs. Alternatively, it is preferable that the above-described baseline value correction unit change the upper limit value Y for each of the times X at which the baseline value is varied to (a/A)·Y, where A is an average value of the capacitances of the respective electrode pairs, and a is an individual capacitance of the respective electrode pairs. By specifically changing the time X and the upper limit value Y for each electrode pair in this manner, it is possible to prevent erroneous detection in all electrode pairs.

DETAILED DESCRIPTION OF THE PREFERRED EMBODIMENTS

Hereinafter, a touch panel device according to an embodiment to which the present invention is applied will be described with reference to the drawings.

Figure 1:
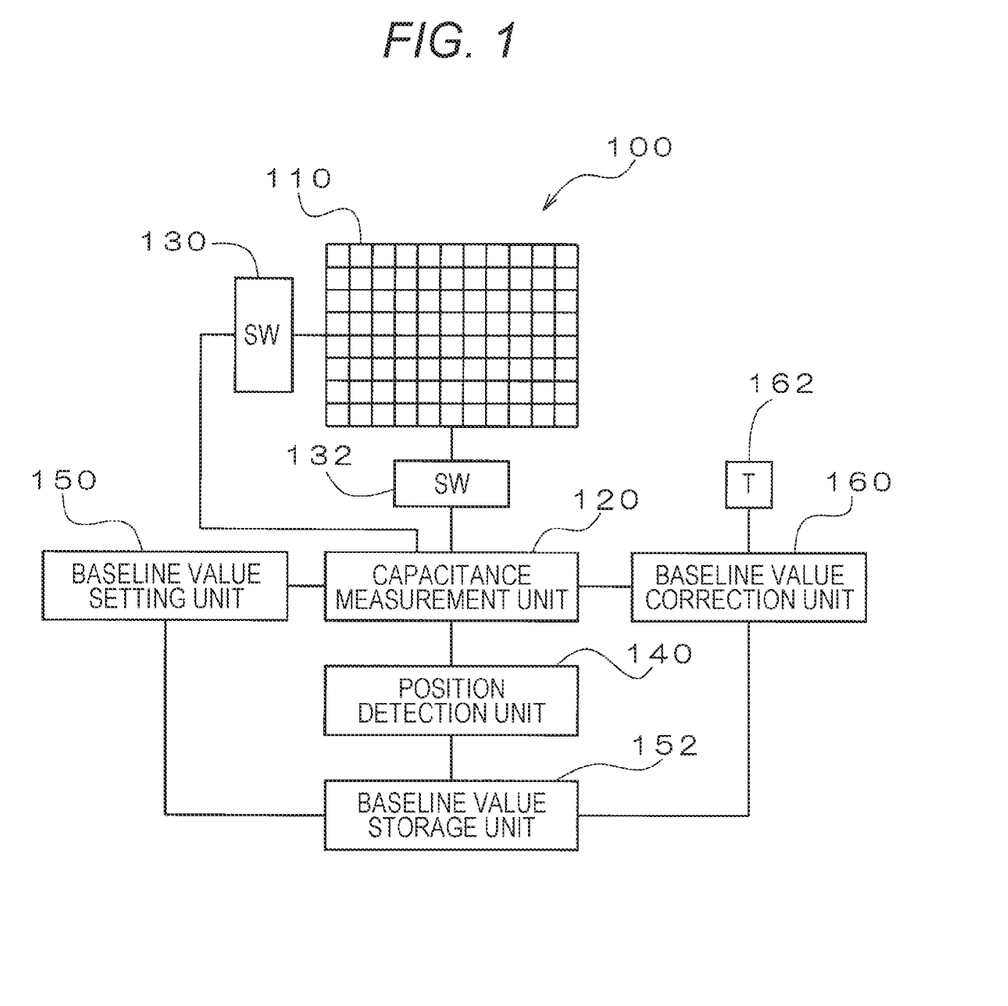
FIG. 1 is a diagram illustrating a configuration of a touch panel device according to an embodiment.

FIG. 1 is a diagram illustrating a configuration of a touch panel device according to an embodiment. A touch panel device 100 is disposed to overlap a display screen of a display device, for example, detects a position on the screen pointed to by an indicator such as a finger, and includes a touch panel 110.

The touch panel 110 has a position detection area that covers the entire display screen of the display device, and includes a plurality of first transparent electrodes 110A extending in an X-axis direction (horizontal direction) of the position detection area and a plurality of second transparent electrodes 110B extending in a Y-axis direction (vertical direction).

Figure 2:
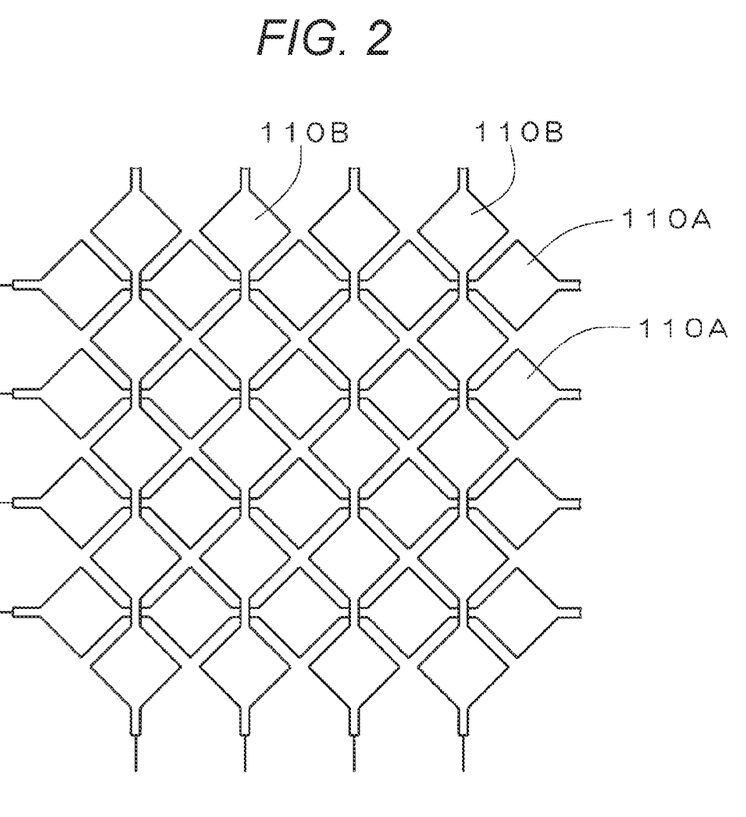
FIG. 2 is a diagram illustrating a specific example of first and second transparent electrodes included in a touch panel.

FIG. 2 is a diagram illustrating a specific example of first and second transparent electrodes 110A and 110B included in the touch panel 110. In the example illustrated in FIG. 2, the first transparent electrode 110A extending in the X-axis direction has a shape in which a plurality of square electrodes arranged such that one diagonal line is parallel to the X-axis are arranged along the X-axis and are connected to each other. Similarly, the second transparent electrode 110B extending in the Y-axis direction has a shape in which a plurality of square electrodes arranged such that one diagonal line is parallel to the Y-axis are arranged along the Y-axis and are connected to each other. As illustrated in FIG. 2, the connecting portions connecting the adjacent square electrodes are arranged to cross each other, whereby the entire display screen is covered with the square electrodes of the first and second transparent electrodes 110A and 110B. The first and second transparent electrodes 110A and 110B are formed using, for example, an indium tin oxide (ITO) film.

In addition, the touch panel device 100 illustrated in FIG. 1 includes a capacitance measurement unit 120, switches (SW) 130 and 132, a position detection unit 140, a baseline value setting unit 150, a baseline value storage unit 152, a baseline value correction unit 160, and a temperature sensor (T) 162.

The capacitance measurement unit 120 measures the capacitance between the first transparent electrode 110A and the second transparent electrode 110B provided on the touch panel 110 while changing the combination thereof. This combination change is performed by switching between the switch 130 that selectively connects the plurality of first transparent electrodes 110A and the switch 132 that selectively connects the plurality of second transparent electrodes 110B.

The position detection unit 140 detects a position pointed to by an indicator such as a user's finger based on a change in a detection value (Raw value) of capacitance between the first transparent electrode 110A and the second transparent electrode 110B measured by the capacitance measurement unit 120. Schematically, in a case where the value greatly increases in the Raw values measured while changing the combination of the first transparent electrode 110A and the second transparent electrode 110B, the position where the first transparent electrode 110A and the second transparent electrode 110B of this combination intersect is specified as the position indicated by the indicator.

The baseline value setting unit 150 performs a calibration operation prior to the position detection operation by the position detection unit 140, and acquires the reference capacitance of the touch panel 110 (capacitance for each combination of the first transparent electrode 110A and the second transparent electrode 110B) measured by the capacitance measurement unit 120 as a baseline value which is a reference at the time of position detection in a state where the indicator is not in contact with the touch panel 110. The position detection unit 140 can ascertain the presence or absence and the degree of change in the Raw value by comparing the baseline value with the Raw value. The baseline value acquired by the baseline value setting unit 150 is stored in the baseline value storage unit 152.

The baseline value correction unit 160 appropriately corrects the baseline value stored in the baseline value storage unit 152. For example, the temperature around the touch panel device 100 detected using the temperature sensor 162 is monitored, and the baseline value is corrected in the normal correction mode in a case where the temperature change amount is equal to or less than a predetermined value and in the temperature sudden change correction mode in a case where the temperature change amount exceeds the predetermined temperature.

The above-described capacitance measurement unit 120 corresponds to the capacitance measurement unit, the baseline value setting unit 150 corresponds to the baseline value setting unit, the position detection unit 140 corresponds to the position detection unit, the baseline value correction unit 160 corresponds to the baseline value correction unit, and the temperature sensor 162 corresponds to the temperature detection unit.

The touch panel device 100 of the present embodiment has such a configuration, and the operation thereof, in particular, the correction operation of the baseline value, will be described below.

(Normal Correction Mode)

First, a correction operation of the baseline value in the normal correction mode will be described.

Figure 3:
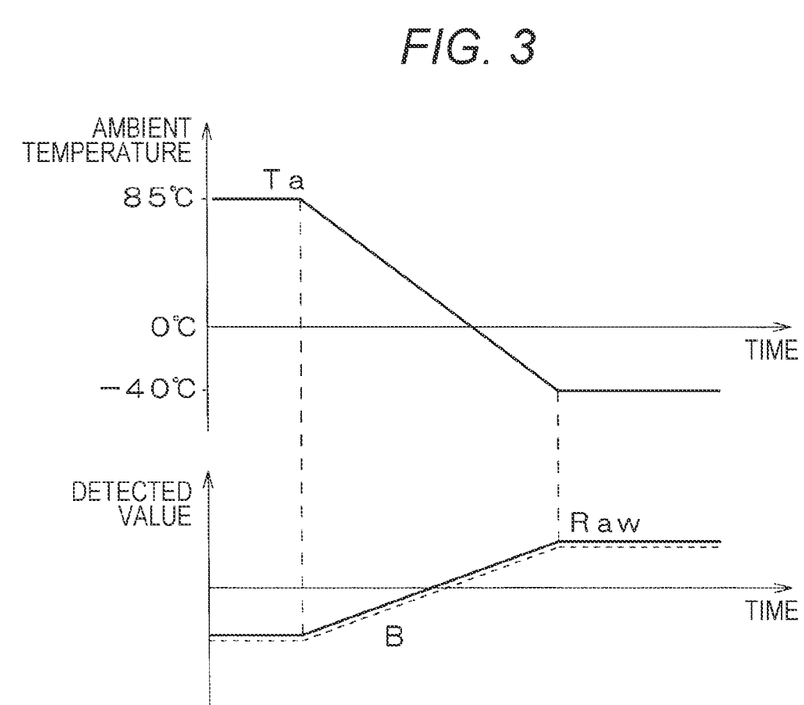
FIG. 3 is a diagram illustrating a relationship between a temperature change, a Raw value, and a baseline value.

FIG. 3 is a diagram illustrating a relationship between a temperature change, a Raw value, and a baseline value. In the example illustrated in FIG. 3, an ambient temperature Ta of the touch panel device 100 gradually decreases from 85° C. to −40° C. In such a case, even in a state where the indicator is not in contact with the touch panel 110, the Raw value increases to follow the temperature change. The baseline value correction unit 160 performs a correction operation of changing a baseline value B in accordance with an increase in the Raw value.

Figure 4:
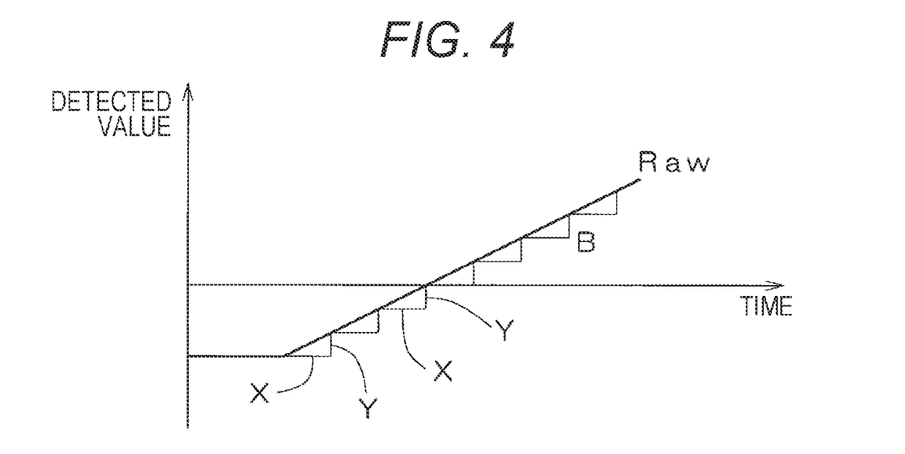
FIG. 4 is an explanatory diagram of an operation of correcting a baseline value in a normal correction mode.

FIG. 4 is an explanatory diagram of an operation of correcting the baseline value in the normal correction mode. In FIG. 4, X is an update frequency (fixed value) which is an update time interval at which the baseline value is changed. Y is a variation amount that is an upper limit value (fixed value) for changing the baseline value B. As described above, when the Raw value rises, the baseline value B serving as a reference for position detection also rises, but the rising interval is X, and the baseline value B is changed stepwise every time the time X elapses. Moreover, if the upper limit value of the changed variation amount is Y and the increase in the Raw value exceeds Y after the time X has elapsed, the correction operation of increasing the baseline value B by Y is performed at that time. In addition, if the increase in the Raw value is equal to or less than Y after the lapse of the time X, the correction operation of increasing the baseline value B by the increase in the Raw value is performed.

In a case where the temperature change is gentle, the baseline value B is changed by such a correction operation. In this state, when the indicator comes into contact with the touch panel 110, the Raw value corresponding to the contact position rapidly increases. However, since the value of the baseline value B is fixed until the next update time point, the amount of change in capacitance obtained as a difference by subtracting the baseline value B from the Raw value increases, and when the difference exceeds a predetermined threshold value, the position corresponding to the Raw value is detected as the contact position.

(Temperature Sudden Change Correction Mode)

In the touch panel 110, a sensor conductor (first and second transparent electrodes 110A and 110B) and a ground layer overlap, an optical clear adhesive (OCA), a polarizing layer, and the like are arranged therebetween, and a wiring is further drawn out to be adjacent thereto. Therefore, even in a case where no indicator approaches, the capacitance of the touch panel 110 is not the same at each place. For this reason, the baseline value setting unit 150 performs calibration, and sets the baseline value in accordance with the non-uniform capacitance.

Figure 5:
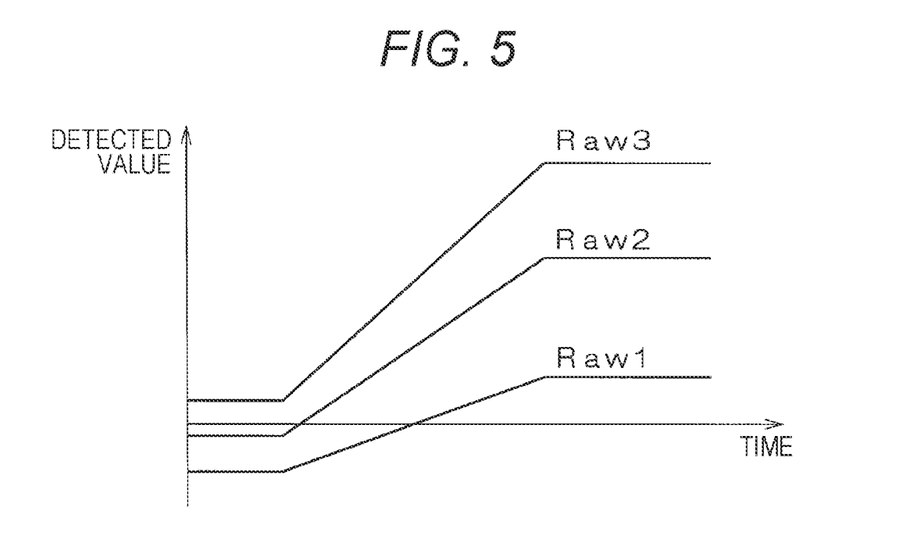
FIG. 5 is a diagram illustrating a relationship between the temperature change and the Raw value corresponding to different capacitances.

However, the degree of change in the Raw value corresponding to the temperature change is determined according to the magnitude of the capacitance at each position of the touch panel 110, and is not constant. FIG. 5 is a diagram illustrating a relationship between the temperature change and the Raw value corresponding to different capacitances. The example illustrated in FIG. 5 illustrates a case where the ambient temperature Ta of the touch panel device 100 decreases from 85° C. to −40° C. in a case where the temperature changes as in the example illustrated in FIG. 3. Raw 1, Raw 2, and Raw 3 indicate detection values of the capacitance in a case where the capacitance is small, medium, and large, respectively. As illustrated in FIG. 5, when the capacitance at the detection point is large, the Raw value also increases, and the amount of change in the Raw value that changes following the temperature change also increases. As described above, the variation itself in the Raw value before the temperature change can be handled by appropriately setting the baseline value by calibration.

On the other hand, in a case where a rapid temperature change occurs, since the degree of change in the Raw value varies depending on the magnitude of the capacitance, it becomes difficult to set an update frequency X by the fixed value and an upper limit value Y (FIG. 4) of the change in the baseline value.

For example, when the update frequency X and the upper limit value Y are set in accordance with Raw 3 in a case where the capacitance is the largest, it is possible to correct the baseline value to follow Raw 2 and Raw 1 in a case where the capacitance is smaller than the update frequency and the upper limit value. However, when the indicator comes into contact with the touch panel 110 and Raw 3 corresponding to the smallest capacitance rises, the baseline value also rises at the same time, and there is a possibility that the contact of the indicator cannot be detected.

On the other hand, if the update frequency X and the upper limit value Y are set in accordance with Raw 1 in a case where the capacitance is the smallest, at the time of a temperature sudden change, even though no indicator is in contact, Raw 3 in a case where the capacitance is the largest rises while deviating from the baseline value, and erroneous detection of the indicator occurs.

In the touch panel device 100 of the present embodiment, the update frequency X and the upper limit value Y are not fixed values, but are set variably according to the magnitude of the capacitance measured at the time of calibration.

(Specific Example of Case of Changing Update Frequency X)

The capacitance at each position of the touch panel 110 measured at the time of calibration is denoted by a, and the average value thereof is denoted by A. When the update frequency of the baseline value at the position having the same capacitance as the average value A is set to X0, the update frequency X of the baseline value at the position having the other capacitance a is set to X0 (A/a).

Figure 6A:
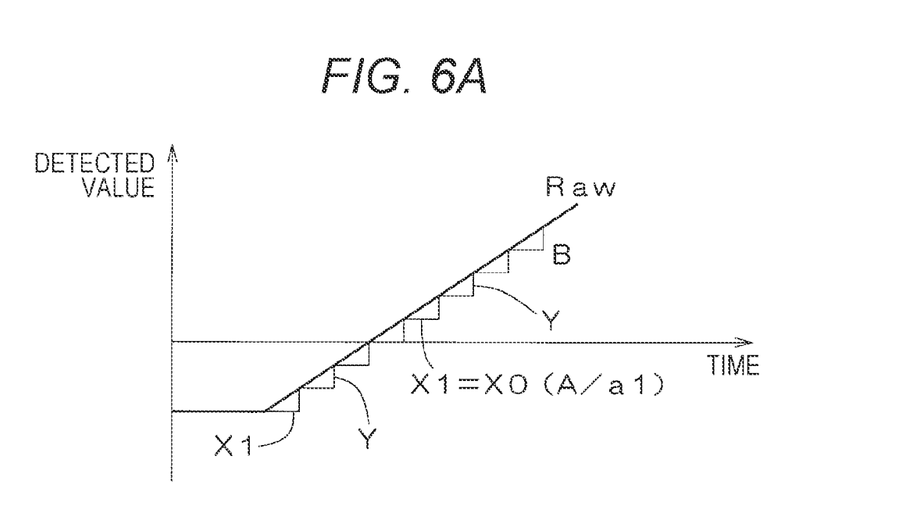
FIGS. 6A and 6B are explanatory diagrams of a case where an update frequency X of the baseline value is set variably.
Figure 6B:
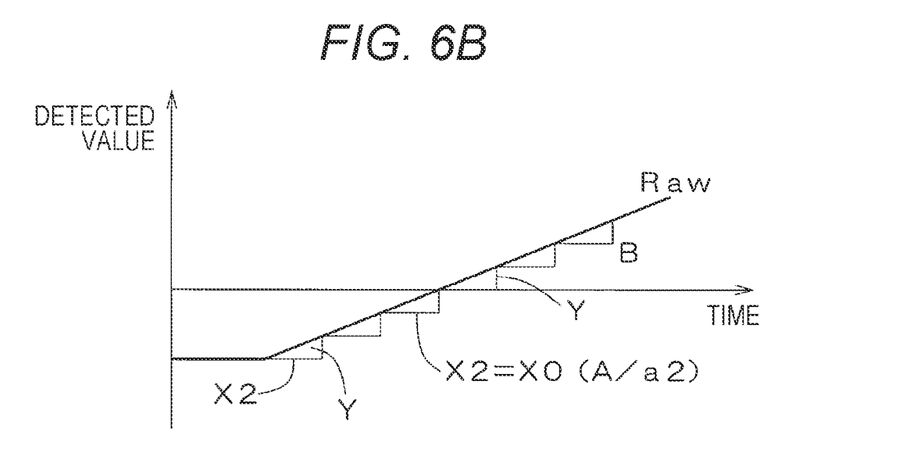

FIGS. 6A and 6B are explanatory diagrams of a case where an update frequency X of the baseline value is set variably. FIG. 6A illustrates a correction operation of the baseline value corresponding to an update frequency X1 of the baseline value at the position having a capacitance a1 greater than the average value A. In addition, FIG. 6B illustrates a correction operation of the baseline value corresponding to an update frequency X2 of the baseline value at the position having a capacitance a2 smaller than the average value A.

When the capacitance a1 is great, the change amount of the capacitance in response to a rapid temperature change also increases, and thus the update frequency X1 (=X0 (A/a1)) of the baseline value decreases (shortens) as illustrated in FIG. 6A in order to follow the large change.

On the other hand, when the capacitance a2 is small, the change amount of the capacitance according to the rapid temperature change becomes small, and thus the update frequency X2 (=X0 (A/a2)) of the baseline value increases (becomes long) as illustrated in FIG. 6B in order to follow the small change.

(Specific Example of Case of Changing Upper Limit Value Y)

The capacitance at each position of the touch panel 110 measured at the time of calibration is denoted by a, and the average value thereof is denoted by A. When an upper limit value at the time of updating the baseline value at a position having the same capacitance as the average value A is set to Y0, an upper limit value Y at the time of updating the baseline value at a position having another capacitance a is set to Y0(a/A).

Figure 7A:
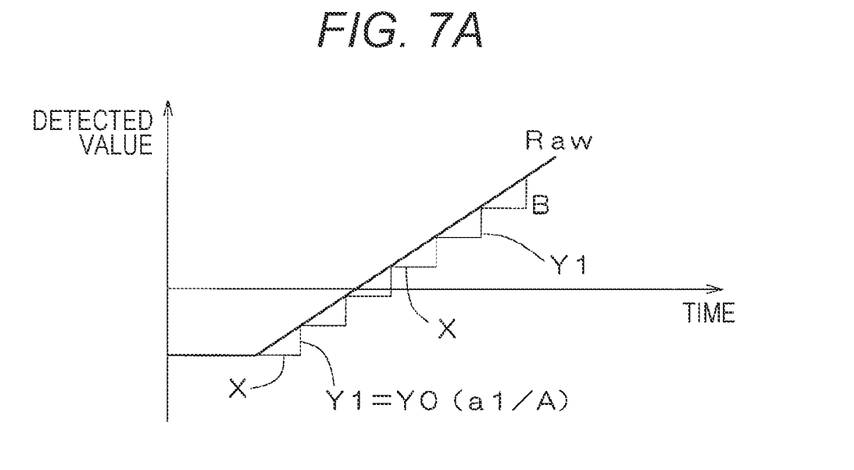
FIGS. 7A and 7B are explanatory diagrams of a case where an upper limit value Y at the time of updating the baseline value is set variably.
Figure 7B:
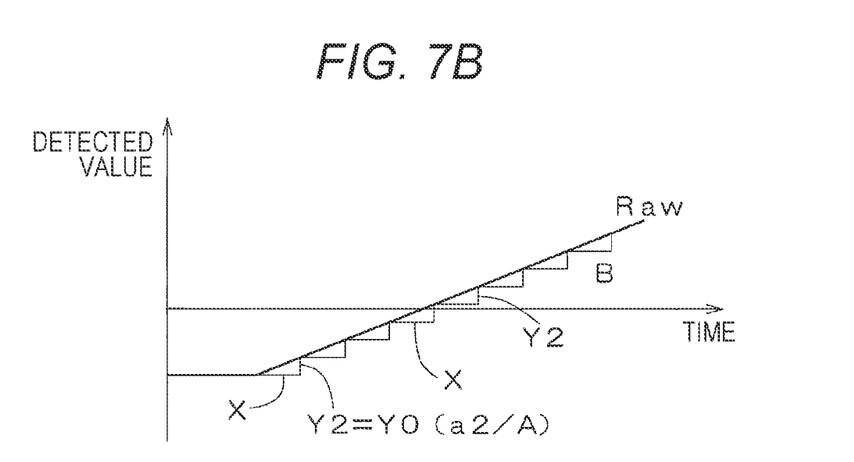

FIGS. 7A and 7B are explanatory diagrams of a case where an upper limit value Y at the time of updating the baseline value is set variably. FIG. 7A illustrates the correction operation of the baseline value corresponding to the upper limit value Y1 at the time of updating the baseline value at the position having the capacitance a1 greater than the average value A. In addition, FIG. 7B illustrates the correction operation of the baseline value corresponding to the upper limit value Y2 at the time of updating the baseline value at the position having the capacitance a2 smaller than the average value A.

In a case where the capacitance a1 is great, the amount of change in capacitance in response to a rapid temperature change also increases, and thus, in order to follow this large change, the upper limit value Y1 (=Y0(a1/A)) at the time of updating the baseline value increases as illustrated in FIG. 7A.

On the other hand, in a case where the capacitance a2 is small, the change amount of the capacitance according to the rapid temperature change becomes small, and thus, the upper limit value Y2 (=Y0(a2/A)) at the time of updating the baseline value becomes small as illustrated in FIG. 7B in order to follow the small change.

As described above, in the touch panel device 100 of the present embodiment, in a case where there is a variation in the capacitance of each electrode pair in the touch panel 110, the baseline value can be changed for each capacitance, so that it is possible to prevent erroneous detection at the time of a rapid temperature change due to this variation. In addition, since it is not necessary to determine the presence or absence of an indicator when changing the baseline value, a configuration for performing this determination is unnecessary, and the configuration can be simplified.

In addition, when the reference capacitance (capacitance at the time of calibration) of each electrode pair of the touch panel 110 is great, the time (update frequency) X is set to a small value or the upper limit value Y of the baseline value at the time of update is set to a large value, and conversely, when the reference capacitance of each electrode pair is small, the time X is set to a large value or the upper limit value Y is set to a small value. As a result, it is possible to individually perform various modifications of the update frequency X and the upper limit value Y in accordance with the capacitance of each electrode pair. For example, in the above-described embodiment, either the update frequency X of the baseline value or the upper limit value Y at the time of update is variably set, but these values may be variably set at the same time.

In addition, in the above-described embodiment, since a transparent touch panel device mounted on a screen of a display device in an overlapping manner is assumed, a case where a transparent electrode is formed on the touch panel 110 has been considered, but the present invention may be applied to a non-transparent touch panel device such as a tablet used on a desk.

As described above, according to the present invention, in a case where there is a variation in the capacitance of each electrode pair in the touch panel, the baseline value can be changed for each capacitance, so that it is possible to prevent erroneous detection at the time of a rapid temperature change due to this variation. In addition, since it is not necessary to determine the presence or absence of an indicator when changing the baseline value, a configuration for performing this determination is unnecessary, and the configuration can be simplified.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A touch panel device comprising:
a capacitance type touch panel having a plurality of electrodes arranged in directions intersecting each other;
a capacitance measurement unit that measures a capacitance between each pair of the electrodes intersecting each other;
a baseline value setting unit that sets the capacitance for each electrode pair measured by the capacitance measurement unit as a reference capacitance in a state where an indicator is not in contact with the touch panel, and sets the baseline value as a baseline value to be used for comparison of capacitance for detecting presence or absence of contact of the indicator, prior to detection of a contact position of the indicator;
a position detection unit that detects a contact position of the indicator by comparing the capacitance of each electrode pair measured by the capacitance measurement unit with the corresponding baseline value; and
a baseline value correction unit that varies the baseline value in accordance with a variation in the capacitance of each electrode pair measured by the capacitance measurement unit over time when a contact position of the indicator is detected,
wherein the baseline value correction unit sets a time X for varying the baseline value for each electrode pair according to the reference capacitance of each electrode pair.

2. The touch panel device according to claim 1, wherein the baseline value correction unit sets the time X to a small value when the reference capacitance of each electrode pair is large, and sets the time X to a large value when the reference capacitance of each electrode pair is small.

3. The touch panel device according to claim 1, wherein the baseline value correction unit sets the time X so that an increase in the baseline value corresponding to each of the electrode pairs does not catch up with an increase in the capacitance when the capacitance of each of the electrode pairs increases in response to an approach of the indicator to the touch panel.

4. The touch panel device according to claim 1, further comprising:
a temperature detection unit that detects an ambient temperature of the touch panel,
wherein the baseline value correction unit changes the time X when a change amount of the temperature detected by the temperature detection unit in a fixed time exceeds a predetermined value.

5. The touch panel device according to claim 1, wherein the baseline value correction unit changes the time X for each of the electrode pairs as a cycle of varying the baseline value to (A/a)·X, where A is an average value of the capacitances of the electrode pairs, and a is an individual capacitance of the electrode pairs.

6. A touch panel device comprising:
a capacitance type touch panel having a plurality of electrodes arranged in directions intersecting each other;
a capacitance measurement unit that measures a capacitance between each pair of the electrodes intersecting each other;
a baseline value setting unit that sets the capacitance for each electrode pair measured by the capacitance measurement unit as a reference capacitance in a state where an indicator is not in contact with the touch panel, and sets the baseline value as a baseline value to be used for comparison of capacitance for detecting presence or absence of contact of the indicator, prior to detection of a contact position of the indicator;
a position detection unit that detects a contact position of the indicator by comparing the capacitance of each electrode pair measured by the capacitance measurement unit with the corresponding baseline value; and
a baseline value correction unit that varies the baseline value in accordance with a variation in the capacitance of each electrode pair measured by the capacitance measurement unit over time when a contact position of the indicator is detected,
wherein the baseline value correction unit sets an upper limit value Y for varying the baseline value for each electrode pair according to the reference capacitance of each electrode pair.

7. The touch panel device according to claim 6, wherein the baseline value correction unit sets the upper limit value Y to a large value when the reference capacitance of each electrode pair is large, and sets the upper limit value Y to a small value when the reference capacitance of each electrode pair is small.

8. The touch panel device according to claim 6, wherein the baseline value correction unit sets the upper limit value Y so that an increase in the baseline value corresponding to each of the electrode pairs does not catch up with an increase in the capacitance when the capacitance of each of the electrode pairs increases in response to an approach of the indicator to the touch panel.

9. The touch panel device according to claim 6, further comprising:
a temperature detection unit that detects an ambient temperature of the touch panel,
wherein the baseline value correction unit changes the upper limit value Y when a change amount of the temperature detected by the temperature detection unit in a fixed time exceeds a predetermined value.

10. The touch panel device according to claim 6, wherein the baseline value correction unit changes the upper limit value Y for each of the times X at which the baseline value is varied to (a/A)·Y, where A is an average value of the capacitances of the respective electrode pairs, and a is an individual capacitance of the respective electrode pairs.

11. A touch panel device comprising:
a capacitance type touch panel having a plurality of electrodes arranged in directions intersecting each other;
a capacitance measurement unit that measures a capacitance between each pair of the electrodes intersecting each other;
a baseline value setting unit that sets the capacitance for each electrode pair measured by the capacitance measurement unit as a reference capacitance in a state where an indicator is not in contact with the touch panel, and sets the baseline value as a baseline value to be used for comparison of capacitance for detecting presence or absence of contact of the indicator, prior to detection of a contact position of the indicator;
a position detection unit that detects a contact position of the indicator by comparing the capacitance of each electrode pair measured by the capacitance measurement unit with the corresponding baseline value; and
a baseline value correction unit that varies the baseline value in accordance with a variation in the capacitance of each electrode pair measured by the capacitance measurement unit over time when a contact position of the indicator is detected,
wherein the baseline value correction unit sets a time X for varying the baseline value and an upper limit value Y thereof for each electrode pair according to the reference capacitance of each electrode pair.

12. The touch panel device according to claim 11, wherein the baseline value correction unit sets the time X to a small value and the upper limit value Y to a large value when the reference capacitance of each electrode pair is large, and sets the time X to a large value and the upper limit value Y to a small value when the reference capacitance of each electrode pair is small.

13. The touch panel device according to claim 11, wherein the baseline value correction unit sets the time X and the upper limit value Y so that an increase in the baseline value corresponding to each of the electrode pairs does not catch up with an increase in the capacitance when the capacitance of each of the electrode pairs increases in response to an approach of the indicator to the touch panel.

14. The touch panel device according to claim 11, further comprising:
a temperature detection unit that detects an ambient temperature of the touch panel,
wherein the baseline value correction unit changes the time X and the upper limit value Y when a change amount of the temperature detected by the temperature detection unit in a fixed time exceeds a predetermined value.

15. The touch panel device according to claim 11, wherein the baseline value correction unit changes the time X for each of the electrode pairs as a cycle of varying the baseline value to (A/a)·X, where A is an average value of the capacitances of the electrode pairs, and a is an individual capacitance of the electrode pairs.

16. The touch panel device according to claim 11, wherein the baseline value correction unit changes the upper limit value Y for each of the times X at which the baseline value is varied to (a/A)·Y, where A is an average value of the capacitances of the respective electrode pairs, and a is an individual capacitance of the respective electrode pairs.

* * * * *